(12) United States Patent
Lisouski et al.

(10) Patent No.: US 9,924,636 B2
(45) Date of Patent: Mar. 27, 2018

(54) CROP HARVESTING MACHINE

(71) Applicant: CLAAS E-SYSTEMS KGAA MBH & CO KG, Guetersloh (DE)

(72) Inventors: Pavel Lisouski, Vanlose (DK); Kristian Kirk, Koebenhavn (DK); Gert Lysgaard Andersen, Alleroed (DK); Morten Rufus Blas, Kongens Lyngby (DK); Ralf Hartmann, Melle (DE); Dirk Lahmann, Halle/Westf. (DE)

(73) Assignee: CLAAS E-Systems KGaA mbH & Co. KG, Dissen am Teutoburger Wald (DE)

( * ) Notice: Subject to any disclaimer, the term of this patent is extended or adjusted under 35 U.S.C. 154(b) by 24 days.

(21) Appl. No.: 15/271,383

(22) Filed: Sep. 21, 2016

(65) Prior Publication Data

US 2017/0086378 A1    Mar. 30, 2017

(30) Foreign Application Priority Data

Sep. 30, 2015   (DE) .......................... 10 2015 116 570

(51) Int. Cl.
*A01D 90/10*   (2006.01)
*A01B 69/04*   (2006.01)
*A01D 43/08*   (2006.01)

(52) U.S. Cl.
CPC ............ *A01D 90/10* (2013.01); *A01B 69/008* (2013.01); *A01D 43/087* (2013.01)

(58) Field of Classification Search
CPC combination set(s) only.
See application file for complete search history.

(56) References Cited

U.S. PATENT DOCUMENTS

| 4,042,132 A | * | 8/1977 | Bohman | .............. A01D 43/073 |
| | | | | 414/335 |
| 4,376,609 A | * | 3/1983 | Bohman | ............ A01D 41/1217 |
| | | | | 356/138 |

(Continued)

FOREIGN PATENT DOCUMENTS

| DE | 102011052688 | 2/2013 |
| DE | 10 2014 108 449 | 2/2015 |

(Continued)

*Primary Examiner* — Angela Y Ortiz
*Assistant Examiner* — Edward J Pipala
(74) *Attorney, Agent, or Firm* — Collard & Roe, P.C.

(57) ABSTRACT

A crop harvesting machine has a machine body and a discharge spout attached to the machine body for overloading crop via a crop stream to a trailer. And electronic spout control and a discharge spout drive arrangement displaces the discharge spout relative to the machine body based on drive commands of the electronic spout control for guiding the crop stream to a target hit point at the trailer. A first sensor arrangement generates sensor information by optically identifying a reference feature at the trailer and detecting the position of the reference feature and/or space orientation of the reference feature. The second sensor arrangement generates sensor information by detecting a space orientation of the machine body, the discharge spout or both. The electronic spout control generates its drive commands for guiding the crop stream based on the sensor information.

12 Claims, 4 Drawing Sheets

(56) References Cited

U.S. PATENT DOCUMENTS

| | | | | |
|---|---|---|---|---|
| 4,441,846 A | * | 4/1984 | Johnson | A01D 43/073 |
| | | | | 414/335 |
| 4,529,348 A | * | 7/1985 | Johnson | A01D 43/07 |
| | | | | 406/165 |
| 9,107,344 B2 | | 8/2015 | Madsen et al. | |
| 9,313,951 B2 | | 4/2016 | Herman et al. | |
| 9,532,504 B2 | | 1/2017 | Herman et al. | |
| 2009/0044505 A1 | | 2/2009 | Huster et al. | |
| 2012/0215394 A1 | * | 8/2012 | Wang | A01D 41/1278 |
| | | | | 701/24 |
| 2016/0323519 A1 | * | 11/2016 | Boydens | A01D 43/087 |

FOREIGN PATENT DOCUMENTS

| | | |
|---|---|---|
| EP | 2020174 | 2/2009 |
| EP | 2301318 | 3/2011 |
| EP | 2792229 | 10/2014 |
| GB | 2517049 | 2/2015 |

* cited by examiner

CROP HARVESTING MACHINE

CROSS-REFERENCE TO A RELATED APPLICATION

The invention described and claimed hereinbelow is also described in German Patent DE 10 2015 12 116 570.8, filed on Sep. 30, 2016. This German Patent Application, subject matter of which is incorporated herein by reference, provides the basis for a claim of priority of invention under 35 U.S.C. 119(a)-(d).

BACKGROUND OF THE INVENTION

The invention is directed to a crop harvesting machine that comprises a machine body and a discharge spout attached to the machine body for over loading crop via a crop stream to a trailer, requiring that the crop stream be guided into a receiving area of the trailer, which mostly is defined by an upper, open side of the trailer. A spout drive arrangement is assigned to the discharge spout such that the discharge spout is displaced relative to the machine body by transmitting drive commands to the discharge spout drive arrangement.

It is a challenging task to constantly align the discharge spout, such that the resulting crop stream does not miss the receiving area of the trailer. This is particularly true for the case that the crop harvesting machine is a self-propelled machine, which is followed by a combination of a tractor and a trailer.

DE 10 2014 108 449 A1, discloses an electronic spout control which is designed for generating drive commands to the discharge spout drive arrangement for automatically guiding the crop stream to a target hit point at the trailer. For this, a first sensor arrangement is provided, which generates sensor information by optically identifying a reference feature at the trailer and by detecting the position of this reference feature. Also, the known crop harvesting machine is provided with numerous sensors, for example, acceleration sensors, gyroscopes or the like, which seem to be provided for guiding the harvesting machine such.

Any change in driving direction puts a challenge to the automatic guidance of the discharge spout, as even small curves have a large impact on the actual hit point of the crop stream. The known crop harvesting machine does not approach this challenge at all, such that its dynamic behavior of the spout control in view of a change in the driving direction is expected to be suboptimal.

SUMMARY OF THE INVENTION

The present invention overcomes the shortcomings of known arts, such as those mentioned above.

The invention improves known crop harvesting machines such that the dynamic behavior of the electronic spout control is optimized in particular in view of a change in the driving direction of the crop harvesting machine.

As a basis for the invention, it has been found that one of the main reasons for the crop stream missing the receiving area of the trailer is an unexpected change in space orientation of the machine body and/or the discharge spout. The reason for this is the discharge spout is of oblong form which leads to the fact that small deviations in space orientation cause relatively large deviations in the course of travel of the crop stream.

Accordingly, the invention includes a second sensor arrangement that provides sensor information by detecting a space orientation of the machine body and/or the discharge spout, where the electronic spout control generates its drive commands for guiding the crop stream not only based on the sensor information of the first sensor arrangement, but also based on the sensor information of the second sensor arrangement. With this basic concept it is possible for the electronic spout control to react on a change in space orientation of the machine body and/or the discharge spout such that the impact of this change in space orientation on the crop stream may be minimized.

It may be pointed out that the expression "position" represents a point in space, which may be defined in Cartesian coordinates. The expression "space orientation" represents the orientation of the respective component in this particular position. The space orientation may be defined by a yaw angle, a pitch angle and a roll angle.

In an embodiment, a number of preferred embodiments for the realization of the second sensor arrangement are possible. Preferably, the second sensor arrangement comprises a mechanic or electronic gyroscope, which may well detect a change and/or a change rate in space orientation of the machine body and/or the discharge spout.

In another embodiment, the first sensor arrangement comprises a camera arrangement or a laser sensor arrangement in order to identify the respective reference feature at the trailer. Here the proposed solution shows another advantage. Due to the fact that optical sensor arrangements generally require a relatively long evaluation time, the update frequency of the sensor information provided to the electronic spout control is higher for the second sensor arrangement than for the first sensor arrangement. This means that a delay in acquiring the sensor information of the first sensor arrangement is compensated by the high update frequency of the sensor information for the second sensor arrangement.

In another embodiment, based on the sensor information of the second sensor arrangement, the drive track of the crop harvesting machine is determined. The first sensor arrangement now only searches for the reference feature in a search area, which search area is defined by the drive track (preferably in the drive track), of the crop harvesting machine. This makes it possible to exclude the surrounding of the drive track from searching, which prevents erroneously identifying a contour in the surrounding of the drive track as the reference feature.

According to another embodiment, the electronic spout control detects the crop harvesting machine during into a curve by detecting an above noted yaw-rate. At least in a first part of the curve the electronic spout control applies the sensor information of the second sensor arrangement for guiding the crop stream to the target hit point. The same general principle may be applied to the crop harvesting machine entering into an inclination.

In another embodiment, the electronic spout control works independently from a steering control of the crop harvesting machine. With this independence the electronic spout control together with the discharge spout drive arrangement add up to an autonomous system arranged on top of the machine body.

BRIEF DESCRIPTION OF THE DRAWING FIGURES

The invention is explained in greater detail in the following with reference to a drawing. In the drawings.

Figure 1:
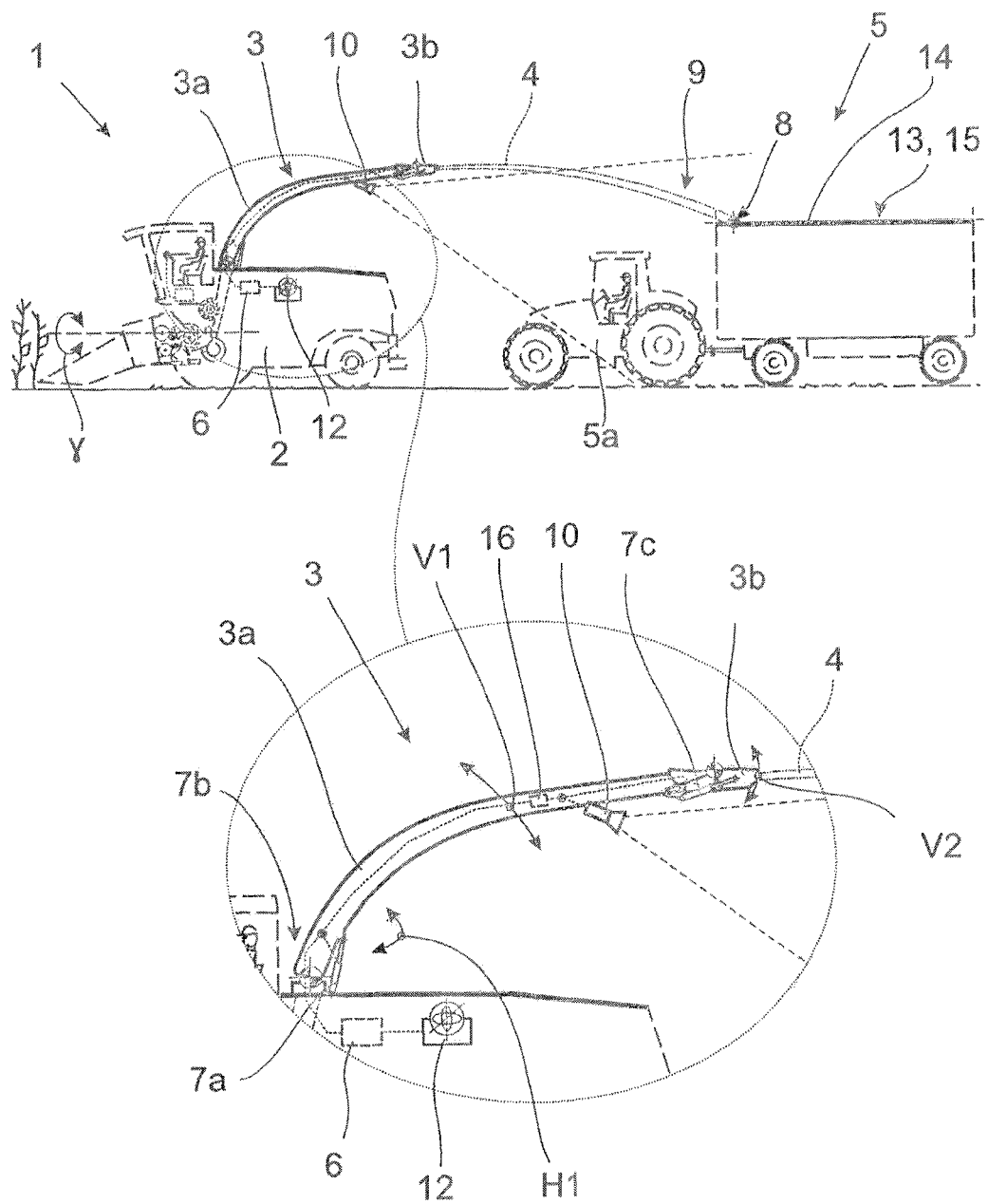
FIG. 1 depicts an inventive crop harvesting machine cooperating with a combination of a tractor and a trailer in a side view.
Figure 2A:
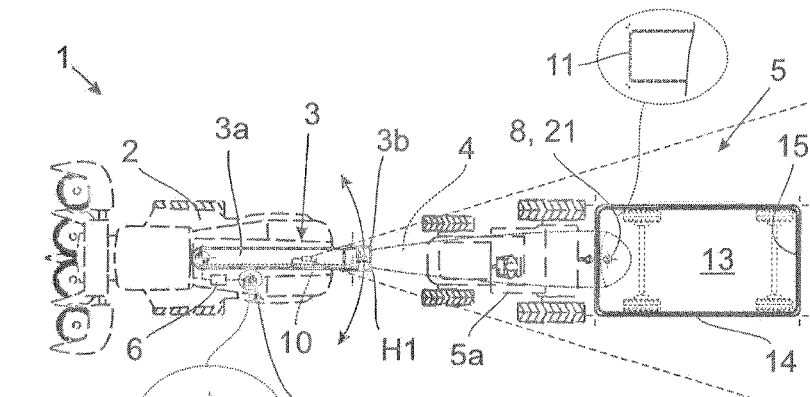
FIG. 2a depicts the arrangement according to FIG. 1 during normal operation.
Figure 2B:
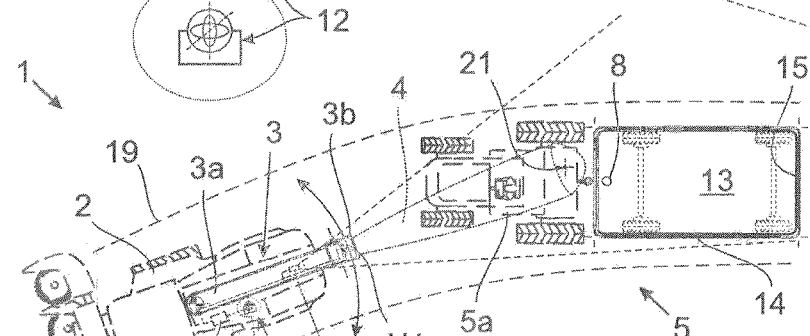
FIG. 2b depicts the arrangement according to FIG. 1 in the very beginning of a curve.
Figure 2C:
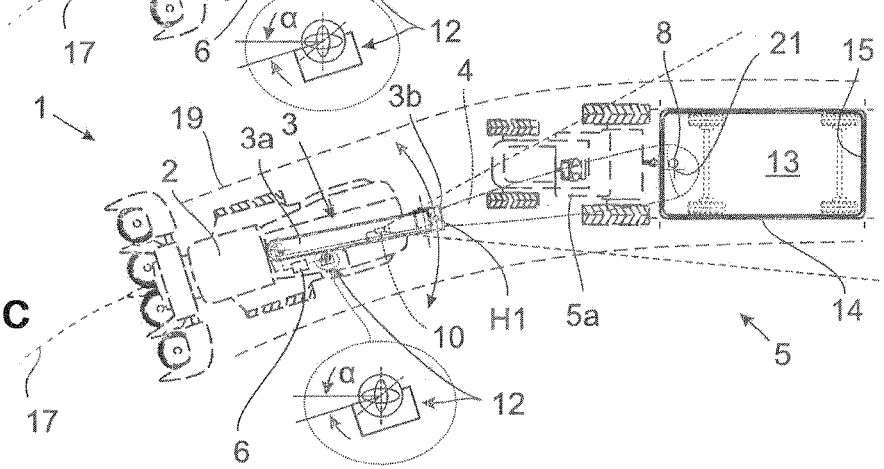
FIG. 2c depicts the curve after deflecting the discharge spout based on the sensor information of the second sensor arrangement.
Figure 3A:
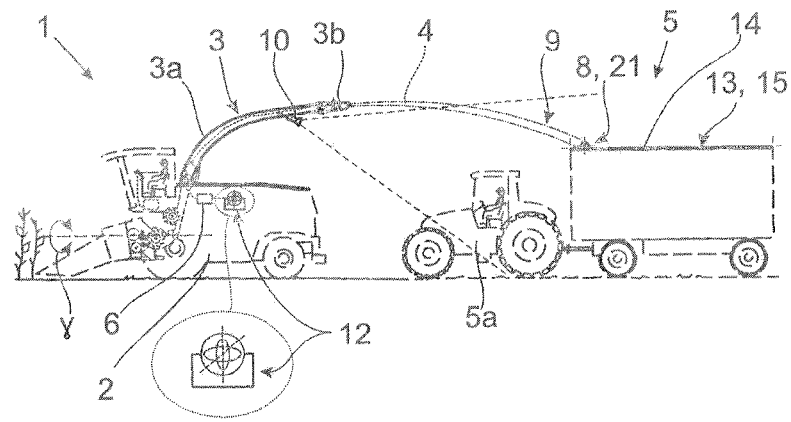
FIG. 3a depicts the arrangement according to FIG. 1a during normal operation.
Figure 3B:
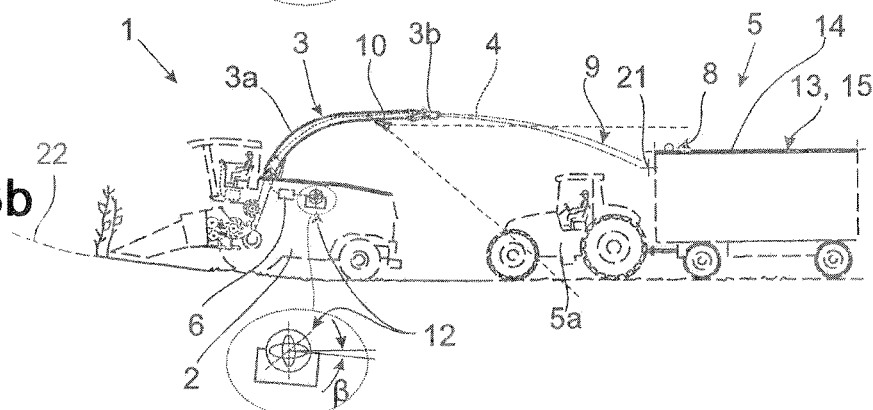
FIG. 3b depicts the arrangement according to FIG. 1a in the very beginning of an inclination.
Figure 3C:
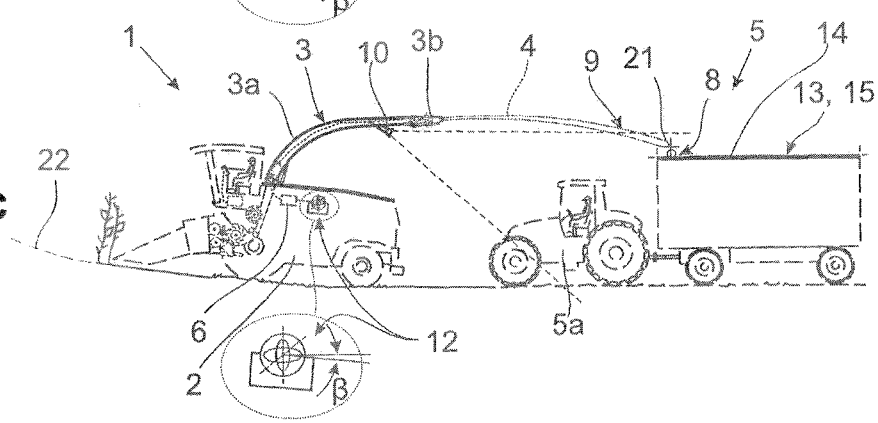
Figure 4:
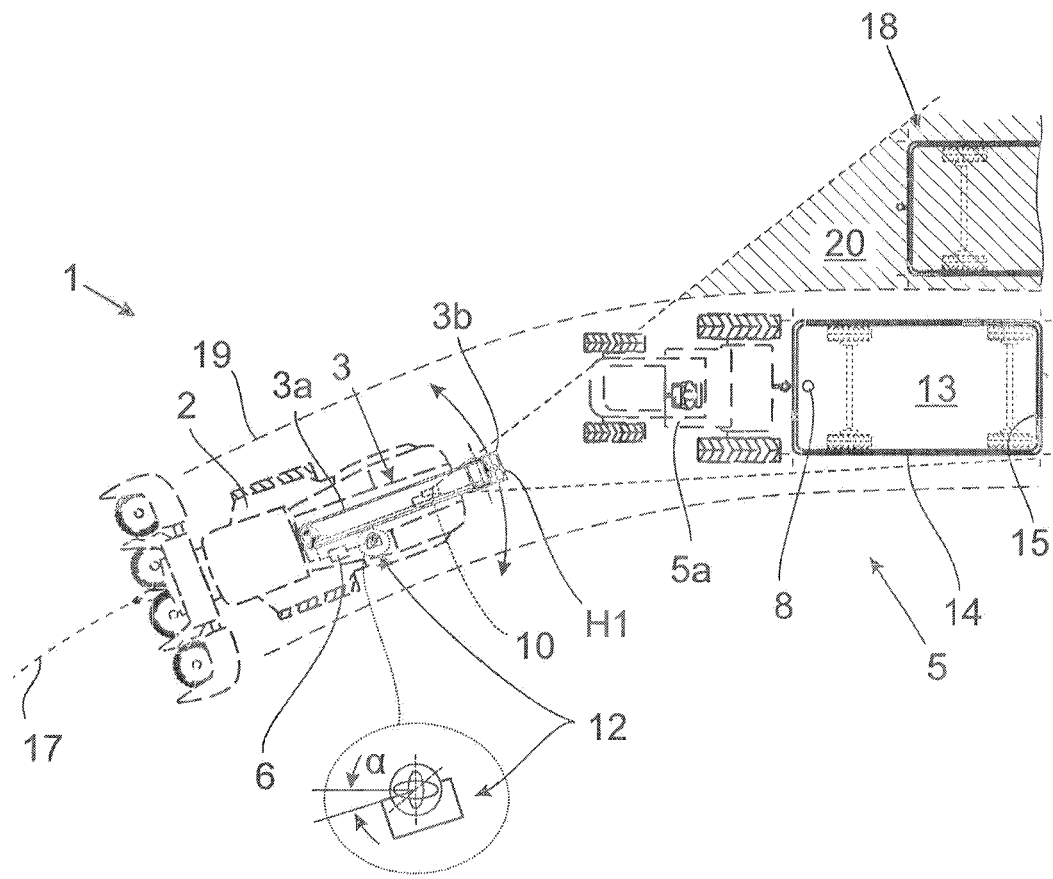

FIG. 3c the arrangement according to FIG. 1a during the inclination after deflecting the discharge spout based on the sensor information of the second sensor arrangement; and FIG. 4 depicts the arrangement according to FIGS. 2a-c during the electronic spout control excluding the surrounding of the driving track from the search for a reference feature by the first sensor arrangement.

DETAILED DESCRIPTION OF THE PREFERRED EMBODIMENTS

The following is a detailed description of example embodiments of the invention depicted in the accompanying drawing. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

As disclosed herein, the proposed crop harvesting machine 1 may be of various designs, for example, a combine or a forage harvester. While those crop harvesting machines 1 are self-propelled machines, the invention may well be applicable to crop harvesting machines 1, that are being pulled by a tractor or the like.

As shown, the crop harvesting machine 1 comprises a machine body 2 and a discharge spout 3 attached to the machine body 2, which discharge spout 3 serves for overloading crop via a crop stream 4 to a trailer 5.

An electronic spout control 6 and a discharge spout drive arrangement 7 are provided to displace the discharge spout 3 relative to the machine body 2 based on drive commands of the electronic spout control 6. The drive commands may comprise a number of parameters describing the displacement of the discharge spout 3. However, they may also comprise only the coordinates regarding the displacement of the discharge spout 3.

The generation of the drive commands by the electronic spout control 6 serves for guiding the crop stream 4 to a target hit point 8 at the trailer 5. The target hit point 8 is an imaginary point at the trailer 5 which is intended to be hit by the end section 9 of the crop stream 4. The target hit point 8 has preferably been generated by the electronic spout control 6 based on an information regarding the geometry of the trailer 5, which information may be retrieved from a data base or the like.

For an automatic guiding of the crop stream 4 to the target hit point 8, a first sensor arrangement 10 is provided, which generates sensor information by optically identifying a reference feature 11 at the trailer 5 and by detecting the position at/or space orientation of the reference feature 11. A possible reference feature 11 is shown in the detailed view of FIG. 2a. Here the reference feature 11 is part of the frame of the trailer 5.

A second sensor arrangement 12 is provided, which generates sensor information by detecting a space orientation of the machine body 2 and/or the discharge spout 3. The electronic spout control 6 generates its drive commands for guiding the crop stream 4 based on the sensor information of the first sensor arrangement 10 at the sensor information of the second sensor arrangement 12. As noted above, even small changes in space orientation of the machine body 2 and/or the discharge spout 3 lead to large and undesired displacements of the end section 9 of the crop stream 4, which may even lead to the crop stream 4 missing the relevant area of the trailer 5.

The space orientation comprises a yaw angle $\alpha$, which may be taken from FIGS. 2b, 2c and 4, a pitch angle $\beta$, which may be taken from FIG. 3b, c and a roll angle $\gamma$, which is only roughly indicated in FIG. 1. The second sensor arrangement 12 may be designed to detect the absolute space orientation of the machine body 2 and/or the discharge spout 3. However, it may be advantageous to have the second sensor arrangement 12 detect a change and/or change rate in the respective space orientation. This may be explained in further detail later.

FIG. 1 shows the general concept of one preferred operation of the proposed crop harvesting machine 1. During harvesting, the crop harvesting machine 1 cooperates with the combination of a tractor 5a and a trailer 5, which is being pulled by the tractor 5a. The combination of the tractor 5a and the trailer 5 may move behind the crop harvesting machine 1, as shown in FIG. 1. However, the combination of the tractor 5a and the trailer 5 may also move besides the crop harvesting machine 1 such that the crop stream 4 does not necessarily has to extent over the tractor 5a.

As shown in the detailed view in FIG. 1, the discharge spout 3 has a first section 3a, which first section 3a may be moved in an up and down direction V1 by a first drive 7a of the discharge spout drive arrangement 7 and which may be moved in a sidewise direction H1 by a second drive 7b of the spout drive arrangement 7.

In addition, the discharge spout 3 comprises a second section 3b attached to the first section 3a, which second section 3b may be moved by a third drive 7c in an up and down direction V2 relative to the first section 3a of the discharge spout 3. Depending on the area of application more than two sections of the discharge spout 3 may be provided.

The realization of the second sensor arrangement 12 may be based on different sensor categories. Preferably, the second sensor arrangement 12 comprises a mechanic gyroscope or an electronic gyroscope. With this it is possible to measure changes in the space orientation with the second sensor arrangement 12 being of simple constructional design. Alternatively, the second sensor arrangement 12 may be realized as an acceleration sensor or a compass, each possibly being of mechanic or electronic design. Other sensor categories may well be applied for the second sensor arrangement 12.

The first sensor arrangement 10, for identifying the reference feature 11 at the trailer 5, preferably comprises a camera arrangement, further preferably a 3D camera arrangement, which allows the application of a large number of standardized components. Alternatively, the first sensor arrangement 10 may comprise a laser sensor arrangement, further preferably a laser scanner arrangement, for generation the respective sensor information.

There exist various possibilities for the definition of the reference feature 11, which is to be identified by the first sensor arrangement 10. Here and preferably the reference feature 11 is defined by a crop receiving area 13, in particular, a frame structure 14 of the crop receiving area 13, of the trailer 5. This is particularly true for a trailer 5, which comprises a box like container 15, and again shows an open top providing the above noted crop receiving area 13.

The first sensor arrangement 10 comprises an evaluation unit 16, which is only indicated in the detailed view in FIG. 1. The evaluation unit 16 evaluates the sensor signals generated by the first sensor arrangement 10 in order to identify the above noted reference feature 11. As the analysis of the sensor signals of the first sensor arrangement 10 is time consuming, in particular when the first sensor arrangement 10 requires 3D image processing, the update frequency of the resulting sensor information provided to the electronic spout control 6 is higher for the second sensor arrangement 12 than for the first sensor arrangement 10. In general terms the second sensor arrangement 12 fills in the gap between two update cycles of the first sensor arrangement 10 such that the reaction time of the electronic spout control 6 to changes in the space orientation of the machine body 2 and/or the discharge spout 3 is relatively low.

A pragmatic approach to improving the above noted reaction time of the electronic spout control 6 is to configure the electronic spout control 6 to generate drive commands for giving the crop stream 4 to the target hit point 8 based on the sensor information of the first sensor arrangement 10. The sensor information of the second sensor arrangement 12 only comes into play for adjusting the drive commands of the first sensor arrangement 10. This makes it possible to add the second sensor arrangement 12 to an existing electronic spout control 6, which is originally guiding the crop stream 4 based on the sensor information generated by the first sensor arrangement 10.

In one example of the above noted adjustment, the electronic spout control 6 adjusts its drive commands based on the sensor information of the second sensor arrangement 12 if a change or change rate in space orientation of the machine body 2 and/or the discharge spout 3 has been detected by the second sensor arrangement 12. Preferably, this adjustment has been performed only if a change or change rate has been detected.

Preferably, the electronic spout control 6 adjusts its drive commands based on the sensor information of the second sensor arrangement 12 if the detected change or change rate in space orientation of the machine body 2 and/or the discharge spout 3 exceeds a predefined critical value. Again, this adjustment is performed preferably only if the detected change or change rate exceeds the predefined critical value.

FIGS. 2a-c, 3a-c and 4 show preferred modes of operation of the proposed electronic spout control 6, which may well be combined with each other.

FIG. 4 shows that the crop harvesting machine 1 drives in a curve 17 followed by the combination of tractor 5a and trailer 5. On the right side of the trailer 5, a second trailer 18 is parked, which imposes a problem for the correct detection of the reference feature 11 at the first trailer 5.

In the worst case, the second trailer 18 is identified as part of the reference feature 11 such that the electronic spout control 6 would guide the discharge spout 3 to the second trailer 18 leading to a considerable loss in crop. In order to prevent this, according to the proposed solution, the electronic spout control 6 analyzes the sensor information of the second sensor arrangement 12 as follows: Based on the sensor information of the second sensor arrangement 12, the electronic spout control 6 determines the drive track 19 of the crop harvesting machine 1. With this information regarding the drive track 19 of the crop harvesting machine 1 it is possible for the electronic spout control 6 to exclude the area 20 outside of the drive track 19 from the search for the reference feature 11. In detail, the first sensor arrangement 10, for identifying the reference feature 11, searches for the reference feature 11 in a search area, which search area is defined by the drive track 19 and is preferably within the drive track of the crop harvesting machine 1. The first sensor arrangement 10 explicitly excludes the area 20 outside the drive track 19, such that erroneously identifying the second trailer 18 in FIG. 4 as part of the reference feature 11 is not possible any more.

Another curve situation is shown in FIGS. 2a-c. Here, the electronic spout control 6, based on the sensor information of the second sensor arrangement 12, detects the crop harvesting machine 1 entering into the curve 17. Here it is proposed that at least in a first part of the curve 17 the electronic spout control 6 guides the crop stream 4 to the target hit point 8 based on the sensor information of the second sensor arrangement 12 by moving, here and preferably pivoting, at least part of the discharge spout 3, here and preferably the first section 3a of the discharge spout 3, in a sidewise direction H1 by the discharge spout drive arrangement 7.

The crop harvesting machine 1 entering into the curve 17 is shown in FIG. 2b. The actual hit point 21 is far off the target hit point 8 as the space orientation of the machine body 2 has changed by a yaw movement, while the first sensor arrangement 10 has not yet provided an updated sensor information regarding the position of the reference feature 11. However, as the second sensor arrangement 12 already provides the electronic spout control 6 with the yaw angle $\alpha$, the electronic spout control 6, based on the sensor information of the second sensor arrangement 12, generates drive commands in order to compensate the yaw angle $\alpha$ by a corresponding displacement of the discharge spout 3. This is shown in FIG. 2c. Here, it becomes clear that it is the combination of the first sensor arrangement 10 and the second sensor arrangement 12, which leads to low reaction times of the electronic spout control 6 even with dynamic changes in driving direction of the crop harvesting machine 1.

A similar effect may be achieved with a proposed solution in the situation, in which the crop harvesting machine 1 enters into an inclination 22, for example, a hump in a field. Here, the electronic spout control 6, based on the sensor information of the second sensor arrangement 12, detects the crop harvesting machine 1 entering into the inclination 22. Again, at least in a first part of the inclination 22, the electronic spout control 6 guides the crop stream 4 to the target hit point 8 based on the sensor information of the second sensor arrangement 12 by moving, here and preferably pivoting, at least part of the discharge spout 3, here and preferably at least the first section 3a of the discharge spout 3, in an up and down direction V1 by means of the discharge spout drive arrangement 7.

The sequence of FIGS. 3a and 3b show the crop harvesting machine 1 entering into the inclination 22, thereby moving the actual hit point 21 far off from the target hit point 8, as the sensor information of the first sensor arrangement 10 has not yet been updated. Based on the sensor information of the second sensor arrangement 12, the pitch angle $\beta$ performed by the crop harvesting machine 1 is compensated by the electronic spout control 6, as may be seen from FIG. 3c.

As a result, it only takes a simple mechanism of compensation based on the sensor information of the second sensor arrangement 12 to achieve a high robustness of the automatic guidance of the crop stream 4 even with a dynamic change in the space orientation the crop harvesting machine 1. This may not only be achieved for the occurrence of yaw angles and pitch angles, but also for the occurrence of roll angles (not displayed).

According to an embodiment, the agricultural crop harvesting machine 1 also comprises a steering control and a steering drive arrangement for automatic steering of the crop harvesting machine 1 based on drive commands of the steering control. The arrangement is preferably such that the electronic spout control 6 and the steering control, independently from each other, generate drive commands for the steering drive and the discharge spout drive arrangement 7 respectively. Accordingly, the electronic spout control 6 operates at least partly autonomously with respect to the steering control of the crop harvesting machine 1. This makes it particularly easy to provide an existing crop harvesting machine 1 with the proposed solution.

REFERENCE NUMBERS 1 crop harvesting machine
2 machine body
3 discharge spout
3a first section
3b second section
V1 up down direction
V2 up down direction
H1 sideways direction
4 crop stream
5 trailer
6 electronic spout control
7 discharge sprout drive arrangement
7a first drive
7b second drive
7c third drive
8 target hit point
9 end section crop stream
10 first sensor arrangement
11 reference feature
12 second sensor arrangement
A yaw angle
B pitch angle
γ roll angle
13 crop receiving area
14 frame structure
15 container
16 evaluation unit
17 curve
18 second trailer
19 drive track
20 area outside
21 actual hit point
22 inclination As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A crop harvesting machine comprises:
a machine body;
a discharge spout attached to the machine body for overloading crop via a crop stream to a trailer;
an electronic spout control;
a discharge spout drive arrangement to displace the discharge spout relative to the machine body based on drive commands of the electronic spout control for guiding the crop stream to a target hit point at the trailer;
a first sensor arrangement that generates first sensor information by optically identifying a reference feature at the trailer and detects a position of a space orientation of a reference feature, a space orientation of the reference feature or both; and
a second sensor arrangement that generates second sensor information by detecting a space orientation of the machine body, the discharge spout or both;
wherein the electronic spout control generates drive commands for guiding the crop stream based on the first sensor information of the first sensor arrangement and the second sensor information of the second sensor arrangement,
wherein the first sensor arrangement comprises a camera arrangement or a laser sensor arrangement for generating the respective sensor information, and
wherein the second sensor arrangement comprises a mechanic or electronic gyroscope, acceleration sensor or compass for the generation of the respective second sensor information.

2. The crop harvesting machine according to claim 1, wherein the second sensor arrangement detects a change or a change rate in space orientation of the machine body, the discharge spout or both.

3. The crop harvesting machine according to claim 2, wherein the electronic spout control adjusts its drive commands based on the sensor information of the second sensor arrangement if a change or a change rate in space orientation of the machine body, the discharge spout or both is detected by the second sensor arrangement.

4. The crop harvesting machine according to claim 1, wherein the reference feature is defined by a crop receiving area.

5. The crop harvesting machine according to claim 4, wherein the reference feature is defined by a frame structure of the crop receiving area of the trailer.

6. The crop harvesting machine according to claim 1, wherein an update frequency of the sensor information provided to the electronic spout control is higher for the second sensor arrangement than for the first sensor arrangement.

7. The crop harvesting machine according to claim 1, wherein the electronic spout is configured to generate drive commands for guiding the crop stream to the target hit point based on the sensor information of the first sensor arrangement and wherein the electronic spout control is configured to adjust its drive commands based on the sensor information of the second sensor arrangement.

8. The crop harvesting machine according to claim 7, wherein the electronic spout control adjusts its drive commands based on the sensor information of the second sensor arrangement of the detected change or change rate in space orientation of the machine body, the discharge spout or both exceeds a predefined critical value.

9. The crop harvesting machine according to any claim 1, wherein the electronic spout control, based on the sensor information of the second sensor arrangement, determines a drive track of the crop harvesting machine and wherein the first sensor arrangement, for identifying the reference feature, searches for the reference feature in a search area, which search area is defined by the drive track of the crop harvesting machine.

10. The crop harvesting machine according to claim 1, wherein the electronic spout control, based on the sensor information of the second sensor arrangement, detects the crop harvesting machine entering into a curve and at least in a first part of the curve guides the crop stream to the target hit point based on the sensor information of the second sensor arrangement by moving at least part the discharge spout in a sideways direction (H1) using the discharge spout drive arrangement.

11. The crop harvesting machine according to claim 1, wherein the electronic spout control, based on the sensor information of the second sensor arrangement, detects the crop harvesting machine entering into an inclination and at least in a first part of the inclination guides the crop stream to the target hit point based on the sensor information of the second sensor arrangement moving at least part the discharge spout in an up and down direction (V1/V2) using the discharge spout drive arrangement.

12. The crop harvesting machine according to claim 1, wherein the crop harvesting machine comprises a steering control and a steering drive arrangement for automatic steering of the crop harvesting machine based on drive commands of the steering control and wherein the electronic spout control and the steering control, independently from each other, generate drive commands for the steering drive and the discharge spout drive arrangement respectively.

* * * * *